Oct. 29, 1968
G. W. MORSE
3,407,756
HAY WAFERING APPARATUS
Filed Oct. 15, 1962
3 Sheets-Sheet 1
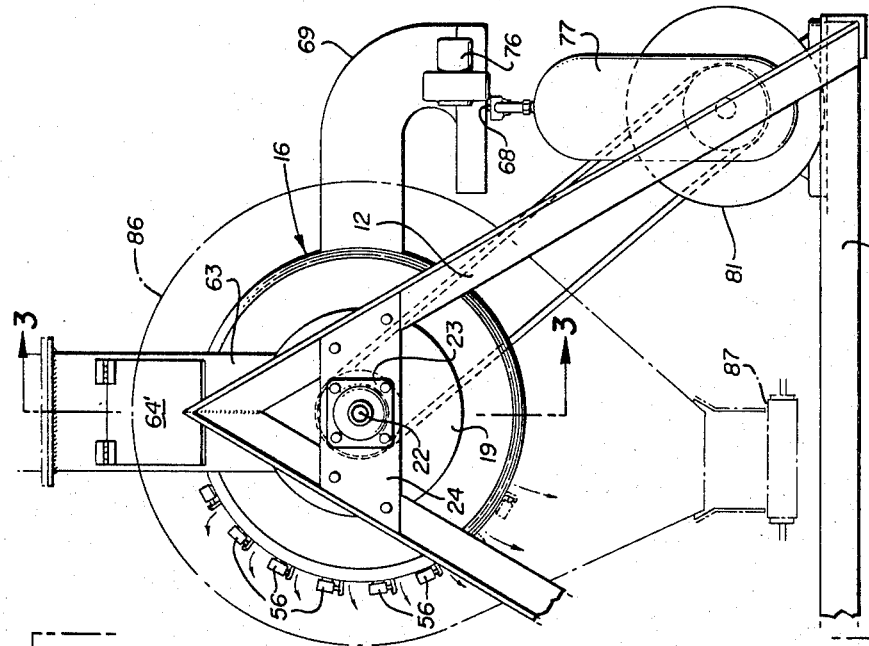
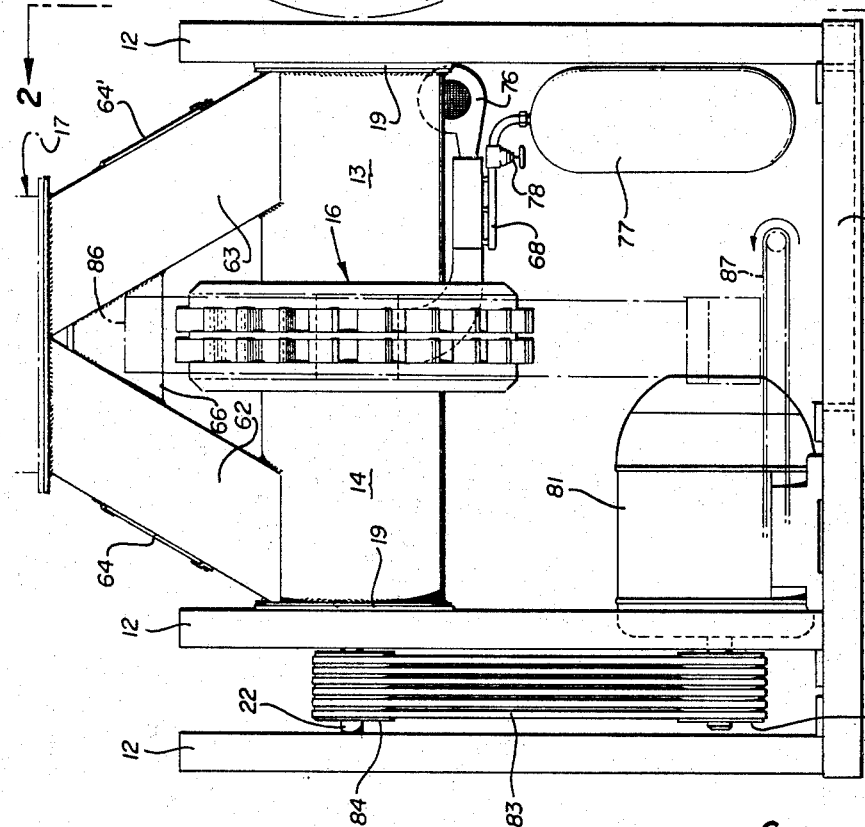
INVENTOR.
George W. Morse
BY
Attorneys

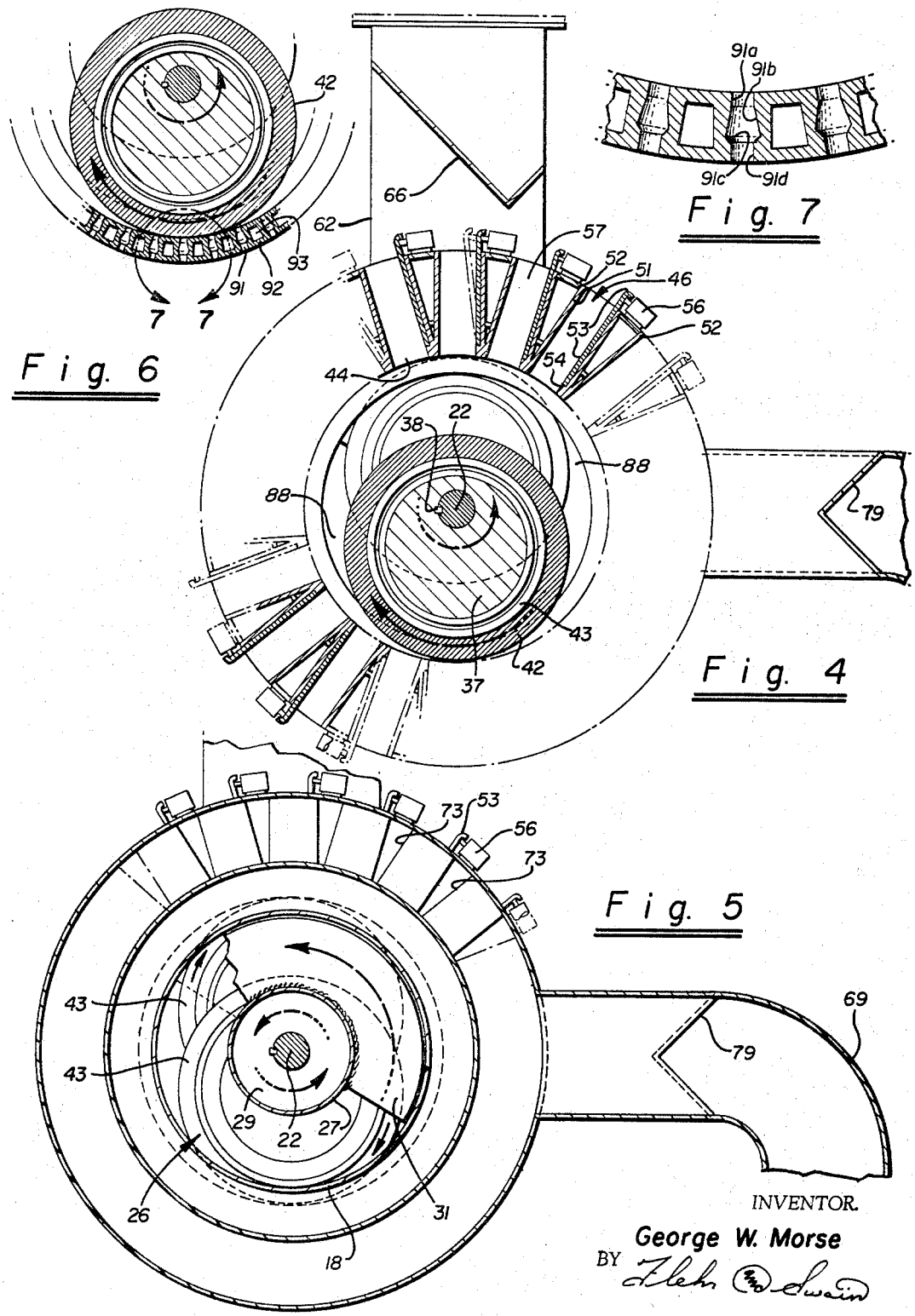

United States Patent Office 3,407,756
Patented Oct. 29, 1968

3,407,756
HAY WAFERING APPARATUS
George W. Morse, P.O. Drawer Z,
Elk Grove, Calif. 95624
Filed Oct. 15, 1962, Ser. No. 230,496
12 Claims. (Cl. 107—14)

This invention relates to a hay wafering apparatus and more particularly to a rotary hay wafering apparatus.

Hay wafering machines of the rotary type which are presently available utilize a single, relatively small roller for extruding the chopped hay through the dies. The use of the small roller makes it relatively difficult to extrude the chopped hay through the dies and introduces relatively severe vibrations into the machine as it is rotated. There is, therefore, a need for a new and improved hay wafering apparatus.

In general, it is an object of the present invention to provide a hay wafering apparatus which overcomes the above named disadvantages.

Another object of the invention is to provide a hay wafering apparatus of the above character in which relatively large rollers are utilized for extruding the hay fragments through the dies.

Another object of the invention is to provide a hay wafering apparatus of the above character in which as large a roller as possible is used for the extrusion assembly utilized without unduly interfering with the feeding of the hay fragments in between the roller and the die openings in the extrusion assembly.

Another object of the invention is to provide a hay wafering apparatus of the above character in which double rollers are utilized to counter-balance each other.

Another object of the invention is to provide a hay wafering apparatus of the above character in which means is provided for supplying heat to the dies utilized for forming the wafers.

Another object of the invention is to provide a hay wafering apparatus of the above character which utilizes continuous rotary motion.

Another object of the invention is to provide a hay wafering apparatus of the above character in which the hay fragments are being continuously urged in front of the rollers.

Another object of the invention is to provide a hay wafering apparatus of the above character which has a relatively high wafer production.

Another object of the invention is to provide a hay wafering apparatus of the above character which is relatively simple to operate and maintain.

Additional objects and features of the invention will appear from the following description in which the preferred embodiment is set forth in detail in conjunction with the accompanying drawings.

Referring to the drawings:

FIGURE 1 is a front elevational view of a hay wafering apparatus incorporating my invention.

FIGURE 2 is a side elevational view looking along the line 2—2 of FIGURE 1.

FIGURE 4 is a cross-sectional view taken along the line 4—4 of FIGURE 3.

FIGURE 5 is a cross-sectional view taken along the line 5—5 of FIGURE 3.

FIGURE 6 is a partial cross-sectional view of another embodiment of an extrusion assembly for use in my apparatus.

FIGURE 7 is an enlarged cross-sectional view of the portion of the die encircled by the line 7—7 of FIGURE 6.

Figure 3:
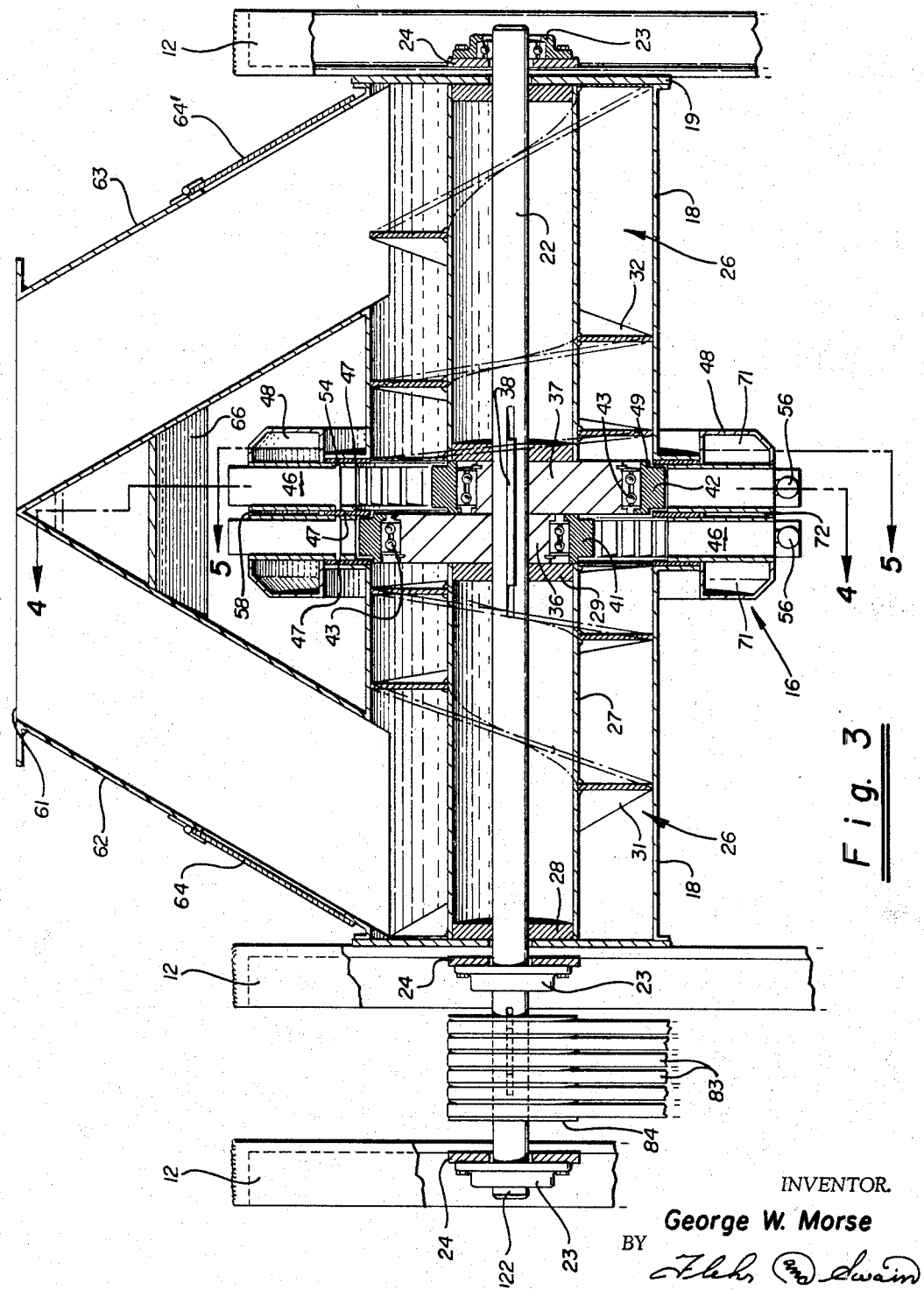
FIGURE 3 is a cross-sectional view taken along the line 3—3 of FIGURE 2.

In general, my hay wafering apparatus consists of a plurality of extrusion dies with their inlet openings arranged in an annulus. A large roller having a diameter substantially greater than the radius of the annulus is mounted for movement in the annulus. Means is provided for supplying hay fragments in front of the roller as it moves. Means is also provided for moving the roller so that it progressively rolls over the hay fragments and forces the hay fragments into dies under pressure to form hay wafers.

More in particular, my hay wafering apparatus, as shown in FIGURES 1-5 of the drawings, consists of a base 11 upon which are mounted three spaced vertical parallel A-frames 12 as shown particularly in FIGURES 1 and 2. A pair of auger assemblies 13 and 14, an extrusion assembly 16 and a forked feed duct assembly 17 are mounted between two of the A-frames 12 as shown particularly in FIGURE 1. Each of the auger assemblies consists of a cylindrical member or auger housing 18 which has one end secured to a circular plate 19 which is affixed to the A-frame 12. The other end of each of the cylindrical members 18 is secured to the extrusion assembly 16 in a manner hereinafter described.

A shaft 22 extends through the A-frames 12, the cylindrical members 18 and the extrusion assembly 16 and is rotatably mounted on the A-frame members in a suitable manner as, for example, by bearings 23 which are mounted on plates 24 secured to the A-frames. An auger 26 is mounted in each of the auger housings 18 and consists of a cylindrical member or drum 27. A pair of circular end plates 28 and 29 are mounted in each end of each of the drums 27. The plates 28 and 29 are fixed to the shaft 22. A single right-hand flight 31 is mounted on the left-hand drum 27 as viewed in FIGURE 3 and a left-hand single flight 32 is mounted on the right-hand drum 27. The flights 31 and 32 are arranged so that they are adapted to auger or advance material toward the extrusion assembly 16 as hereinafter described.

The extrusion assembly 16 is disposed between the two auger assemblies 13 and 14 and consists of a pair of eccentrically mounted members 36 and 37 which are mounted side-by-side on the shaft 22 between the flights 31 and 32 and secured to the shaft by suitable means such as a key 38. The same key 38 engages the end plates 29 of the drums 27 so that the augers 26 will rotate with the shaft. A pair of large rollers 41 and 42 are rotatably mounted on the eccentrically mounted members 36 and 37 by suitable means such as ball bearing assemblies 43. These rollers 41 and 42, as hereinafter described, serve to extrude material through radially extending dies 46 which have their inlet openings 44 arranged in a pair of annuli.

As shown particularly in FIGURES 3, 4 and 5, the rollers 41 and 42 are adapted to enter between three spaced annular plates 47 which are supported by the auger housings 18 and by the annular duct members 48. The rollers 41 and 42 are provided with annular shoulders 49 which are adapted to ride upon the inner peripheries of the annular plates 47.

The dies 46 are mounted between the plates 47 and consist of a fixed plate 51 which is one side of a triangular structure 52 secured to the plates 47 and the duct members 48. Another side of the die is formed by an adjustable plate 53 which is pivoted relative to the triangular structure 52 by ears 54 that extend into the plates 47. The other end of the plate 53 is adapted to be moved toward and away from the side plate 51 by a remotely controlled hydraulic actuator 56. From the arrangement shown, it can be seen that each of the dies 46 forms an extrusion passage 57 which is substantially rectangular in cross-section. Two of the sides are formed by the plates 51 and 53, whereas the other two sides are formed by side walls of the ducts 48, and by an additional duct member 58 which is disposed between the dies 46.

The forked feed duct assembly 17 is utilized for supplying hay to the augers 26 and is provided with an upwardly facing opening 61. This opening 61 communicates with two downwardly and outwardly extending feed ducts 62 and 63 and which are connected to and extend into the cylindrical auger housings 18 adjacent the A-frames 12, as shown particularly in FIGURE 3. Access doors 64 and 64' are provided on the feed ducts to permit observation of the operation of the augers 26. A deflector plate 66 is mounted between the ducts 62 and 63 for deflecting the wafers as they are extruded from the dies.

Suitable means is provided for supplying heated air to the ducts 48 and 58 and, as shown, consists of a burner 68 which is secured to the lower end of a hot air duct 69. This hot air duct 69 is also forked to provide heated air to the annular passages 71 provided in the ducts 48 and the annular passage 72 in the duct 58. The heated air also passes laterally between the dies 46 through openings 73 in the ducts 48 and 58 so that hot air will circulate around all four sides of the dies and thus adequately heat the dies to the desired temperature. A fan 76 is provided in the hot air duct 69 to ensure that the hot air is forced through all the passages to also properly heat the dies. The burner 68 is supplied with a suitable fuel such as butane from a tank 77 mounted upon the base 11. A valve 78 is provided for controlling the fuel to the burner. A deflector 79 is provided in the forked duct 69 for deflecting the wafers as they are extruded.

Means is provided for rotating the shaft 22 and consists of a large motor 81 which is mounted on the base 11 and which drives a pulley 82. A plurality of V-belts 83 are driven by the pulley 82 and drive a pulley 84 which is mounted on the shaft 22 between two of the A-frames 12, as shown in FIGURE 3.

Operation of my hay wafering apparatus may now be briefly described as follows. Let it be assumed that hay has been properly prepared as described in my copending application Ser. No. 212,700, filed July 26, 1962 (now abandoned), and in my continuation-in-part application Ser. No. 224,812, filed Sept. 19, 1962, now abandoned, and that the hay has been chopped in a suitable manner and is supplied into the feed duct assembly 17. The hay is divided by the two separate ducts 62 and 63 and supplied to the auger assemblies 13 and 14. The auger assemblies 13 and 14 as well as the extrusion assembly 16 are being continuously rotated by the motor 81. Thus, the dried hay fragments are advanced from the outer ends of the auger assemblies 13 and 14 towards the extrusion assembly 16 by the right-hand and left-hand flights 31 and 32 of the auger assemblies.

As shown particularly in FIGURE 5, the flights 31 and 32 of the auger assemblies are so positioned that substantial quantities of the hay are being deposited continuously in front of the rollers 41 and 42. As the rollers advance, the hay fragments are forced into the inlet openings 44 of the dies 46. Thus, it can be seen that as the rollers travel around the annuli formed by the openings 44 in accordance with the operation of the cams 36 and 37 driven by the shaft 22, progressive layers or charges of hay are introduced into the dies 46 under pressure.

The amount of pressure required to extrude the hay or hay fragments through the dies 46 is determined by the positioning of the plate 53 which forms one side of each of the dies. As hereinbefore explained, this plate is adjustably positioned by the hydraulic actuator 56 so that the proper pressure is obtained to form the hay fragments into wafers.

The process which is utilized for forming the hay into wafers is very similar to that described in my copending application Ser. No. 212,700, filed July 26, 1962. As the hay fragments are being compacted into the dies 46, the dies are being heated by the heated gases supplied by the burner 68 through the forced hot air duct 69 and through the annular passages 71 and 72. As explained in my copending application, by the utilization of the proper amount of heat, pressure and hold time, it is possible to obtain wafers which as they are extruded from the die have very desirable characteristics as also explained in my copending application.

If desired, a small amount of water can be added to the hay as it is being introduced into the feed chute 17 in order to enhance the quality of the wafers produced, particularly when the hay being introduced into the apparatus is relatively dry.

In the arrangement shown, two sets of dies have been provided which are mounted side by side and two rollers are provided for extruding the hay through the dies. With the arrangement shown with one mounted for movement which is 180° out of phase with the movement of the other roller, a counterbalancing effect is obtained which minimizes the shock loads which are applied to the apparatus particularly during high speed operation. By utilizing such an arrangement, it is possible to utilize augers positioned on opposite sides for feeding the hay fragments to the extrusion assembly. This makes possible a relatively compact apparatus while at the same time making it possible to obtain relatively high wafer production from the apparatus.

The wafers extruded from the dies are extruded in all directions and will drop downwardly into a collector housing 86 where they can be carried away by suitable means such as a conveyor 87.

The use of the rollers 41 and 42 which have a large diameter and in fact a diameter which is substantially greater than the radius of the annulus formed by the openings of the dies makes it much easier for these larger rollers to roll over the masses of material and to compress or force them into the dies than would be the case with much smaller rollers. The use of the larger roller also provides a longer and more gradually tapered wedge-shaped recess 88 between the roller and the die openings which facilitates feeding of the material which is to be compressed into the dies between the roller and the dies. It also makes it easier for the roller to roll over the mass and force it into the dies without any danger of pushing the mass ahead of the roller.

The double roller arrangement in which the rollers are 180° out of phase makes it possible for the forces being created while one roller is extruding material into the dies to be compensated by the forces encountered while the other roller is forcing material into dies 180° removed.

Another embodiment of my hay wafering apparatus is shown in FIGURES 6 and 7. In this embodiment, the dies are relatively small die passages 91 provided in an annular die member 92. The die member 92 is heated in a suitable manner such as by passing heated fluids in the form of gas or liquid through passages 93 provided in the die member. If a liquid is utilized, the size of passages 93 can be decreased so that the spacing between the dies can be decreased and thereby increase the overall efficiency of the apparatus. Each of the dies 91, as shown particularly in FIGURE 7, is provided with four differently shaped portions; a cylindrical or straight sided portion 91a; a relatively long reverse tapered or diverging portion 91b; a forward tapered or converging portion 91c; and a cylindrical or straight sided portion 91d. The divergence and the convergence of the diverging and converging portions 91a and 91b are exaggerated in the drawings. The hay fragments, as they are placed in front of the rollers 41 and 42, are extruded into the cylindrical portions 91a of the dies 91. These portions of the dies are not tapered so that the hay fragments, as they are formed within the die, are not placed under any substantial lateral compression. The pellets, as they are being formed in the dies 91, then enter the portion 91b of the dies having the reverse taper so that any lateral compressing forces which may have occurred are definitely reduced or completely eliminated. The pellets are retained under compression by longitudinal forces which are applied as the pellets are extruded through the portions 91c and 91d. The portions 91d particularly help to shape the pellets before they are extruded from the dies.

As explained above, with the use of the heated dies with pressure and the proper amount of hold time, it is possible to obtain pellets which as they are extruded have the desired characteristics.

The primary feature to be emphasized by the apparatus shown in FIGURES 6 and 7 is that pellets of relatively small size can be produced with my apparatus using substantially the same teaching as in the embodiment shown in FIGURES 1-6.

It is apparent from the foregoing that I have provided a new and improved hay wafering apparatus which is relatively simple and compact. Although the hay wafering apparatus shown in FIGURES 1-6 is a stationary machine, it is readily apparent that, if desired, it can be constructed as a portable machine which can be utilized in the field.

I claim:

1. In a hay wafering apparatus, a plurality of radially extending dies having inlet openings arranged in a pair of annuli, a pair of rollers mounted side by side associated with the pair of annuli and each having a diameter substantially greater than the radius of one of the annuli, the rollers being eccentrically mounted so that peripheral portions thereof are axially offset and radially overlapped in the area of the axis of said pair of annuli, means for driving the rollers 180° out of phase with each other so that the rollers progressively roll over the openings in the dies, and means for supplying hay fragments in front of each of the rollers as the rollers are rotated so that the hay fragments are forced into the dies.

2. Apparatus as in claim 1 wherein said hay fragments supplying means consists of an auger mounted on opposite sides of the pair of rollers, the auger having a diameter substantially equal to the diameter of one of the annuli, means for driving the auger, and duct means for supplying hay fragments to the outer ends of the augers.

3. Apparatus as in claim 2 wherein the means for driving the rollers and the auger means are mounted on a common shaft.

4. Apparatus as in claim 3 wherein the shaft is horizontal and wherein the rollers rotate in vertical planes.

5. Apparatus as in claim 1 together with means for supplying external heat to the dies as the hay fragments are being extruded through the dies.

6. In a hay wafering apparatus, a framework, a shaft rotatably mounted in the framework, a pair of members eccentrically mounted on the shaft side by side and fixed thereto for rotation therewith, a pair of rollers rotatably mounted side-by-side upon the eccentrically mounted members, a pluraltiy of radially extending die assemblies, the die assemblies being arranged so that inlet openings form two adjacent annuli with the same diameter in alignment with the pair of rollers, an auger having a diameter substantially identical to the diameters of the annuli mounted on the shaft on each side of the pair of rollers, one auger having a right hand flight and the other having a left-hand flight, means for supplying hay fragments to the flights, and means for rotating the shaft and the augers and eccentric members mounted thereon to cause the hay fragments to be introduced from the sides of the rollers between the rollers and the openings of the dies so that as the rollers are rolled over the openings in the dies, the hay fragments are forced into the dies.

7. Apparatus as in claim 6 wherein the rollers each have a diameter substantially greater than the radii of the annuli.

8. Apparatus as in claim 6 together with means for supplying external heat to the dies as the hay fragments are forced through the dies.

9. Apparatus as in claim 6 wherein the means for supplying hay fragments to the augers consists of a forked duct supplying hay fragments to the outer ends of the augers.

10. Apparatus as in claim 6 wherein the dies of the die assemblies have a substantially straight sided inlet portion, a diverging intermediate portion, a converging intermediate portion, and a substantially straight sided discharge portion.

11. In a machine for wafering forage material such as hay and the like, the combination of: annular die structure having an annular material-receiving track, an outer material discharge peripheral portion in surrounding relation to the track, and a plurality of uniformly circumferentially spaced, generally radial, similar die cells opening at opposite ends respectively to the track and peripheral portion; press wheel means for extruding material radially outwardly through the cells from the track to said portion, including a carrier coaxial with the annular track, and a plurality of circular press wheels journaled on the carrier respectively on individual axes eccentric to the track and carrier axis and disposed with their peripheries substantially tangent to the track, said wheels being so dimensioned and arranged that peripheral portions thereof are axially offset and radially overlapped, support means and means mounting the die structure and press wheel means on the support means for relative rotation about the track and carrier axis to cause the wheels and track to roll relatively with the wheel peripheries in substantial contact with the track.

12. The invention defined in claim 11 in which: the press wheels are further characterized in that their axes are parallel to the track and carrier axis, they are axially offset and have such axial widths at their peripheries that each wheel rolls on a track portion less than the total axial width of the track, and the track is further characterized in that its axial width is substantially equal to the total of the axial widths of the wheels at their peripheries.

References Cited

UNITED STATES PATENTS

| | | | |
|---|---|---|---|
| 751,752 | 2/1904 | Pilliod | 100—185 XR |
| 2,063,404 | 12/1936 | Selman | 100 |
| 2,757,621 | 8/1956 | Johnson | 100 |
| 2,059,486 | 11/1936 | Payne et al. | 107—14 |
| 2,957,203 | 10/1960 | Marshall | 18—12 |
| 2,958,900 | 11/1960 | Meakin | 100 |
| 2,984,173 | 5/1961 | Roche et al. | 107—14 |
| 3,075,244 | 1/1963 | Glenn | 18—16.5 |
| 3,084,620 | 4/1963 | Gibbons | 100—100 |
| 665,972 | 1/1901 | Patterson. | |
| 729,149 | 1/1903 | Fenn. | |
| 1,467,883 | 9/1923 | Sizer | 107—14 |
| 1,804,283 | 5/1931 | Sizer | 107—8 |
| 1,848,332 | 3/1932 | Estes | 107—8 |
| 1,868,370 | 7/1932 | Sizer | 107—8 |
| 1,909,228 | 5/1933 | Sizer | 107—8 |
| 2,295,838 | 9/1942 | Glaze | 107—8 |
| 2,279,632 | 4/1942 | Meakin | 107—8 |
| 2,336,114 | 12/1943 | Meakin | 107—8 |
| 2,391,638 | 12/1945 | Meakin. | |
| 2,782,736 | 2/1957 | Johnson | 107—14 |
| 2,942,976 | 6/1960 | Kosch. | |
| 2,995,096 | 8/1961 | Roskamp | 107—14 |
| 3,006,272 | 10/1961 | Brady. | |

(Other references on following page)

UNITED STATES PATENTS

| | | | |
|---|---|---|---|
| 3,045,613 | 7/1962 | Kennedy | 107—14 |
| 3,090,182 | 5/1963 | Johnson. | |
| 3,149,585 | 9/1964 | Forth et al. | 107—14 |

FOREIGN PATENTS

| | | |
|---|---|---|
| 875,544 | 6/1942 | France. |
| 770,664 | 3/1957 | Great Britain. |
| 1,250,174 | 11/1960 | France. |
| 510,551 | 10/1930 | Germany. |
| 20,970 | 7/1929 | Australia. |
| 205,253 | 1/1957 | Australia. |
| 196,947 | 5/1923 | Great Britain. |
| 939,759 | 10/1963 | Great Britian. |

OTHER REFERENCES

Agricultural Engineering, August 1961, pp. 412–415 and 423.

Western Livestock Journal, April 1961, pp. 36 and 39.

BILLY J. WILHITE, *Primary Examiner.*